(12) United States Patent
Hsiao et al.

(10) Patent No.: US 7,898,615 B2
(45) Date of Patent: Mar. 1, 2011

(54) BACKLIGHT MODULE WITH LIGHT GUIDE PLATE HAVING PARTIALLY OVERLAPPED REFLECTIVE STRUCTURES AND LIQUID CRYSTAL DISPLAY WITH SAME

(75) Inventors: Chih-Chung Hsiao, Miao-Li (TW); Kuo-Chih Huang, Miao-Li (TW)

(73) Assignee: Chimel Innolux Corporation, Miao-Li County (TW)

( * ) Notice: Subject to any disclaimer, the term of this patent is extended or adjusted under 35 U.S.C. 154(b) by 701 days.

(21) Appl. No.: 12/006,007

(22) Filed: Dec. 29, 2007

(65) Prior Publication Data

US 2008/0158478 A1 Jul. 3, 2008

(30) Foreign Application Priority Data

Dec. 29, 2006 (TW) .............................. 95223105 U

(51) Int. Cl.
*G02F 1/1335* (2006.01)
*F21V 7/04* (2006.01)
*F21V 7/00* (2006.01)

(52) U.S. Cl. .......... 349/65; 349/113; 349/114; 349/115; 362/612; 362/625; 362/97.1; 362/97.2; 362/97.3

(58) Field of Classification Search .................... 349/56, 349/104, 113, 114, 115, 195, 65; 362/612, 362/625, 97.1, 97.2, 97.3
See application file for complete search history.

(56) References Cited

U.S. PATENT DOCUMENTS

| | | | |
|---|---|---|---|
| 6,712,473 B2 * | 3/2004 | Kurematsu | 353/99 |
| 6,793,361 B2 * | 9/2004 | Matsui | 362/97.1 |
| 7,178,962 B2 * | 2/2007 | Yu et al. | 362/609 |
| 7,178,964 B2 * | 2/2007 | Sugiura et al. | 362/616 |
| 7,290,921 B2 | 11/2007 | Lin | 362/625 |
| 2005/0007756 A1 * | 1/2005 | Yu et al. | 362/31 |
| 2008/0158478 A1 * | 7/2008 | Hsiao et al. | 349/65 |
| 2010/0033956 A1 * | 2/2010 | Kirchberger et al. | 362/97.1 |

* cited by examiner

*Primary Examiner* — Brian M Healy
(74) *Attorney, Agent, or Firm* — Wei Te Chung

(57) ABSTRACT

An exemplary backlight module includes a light source and a light guide plate. The light guide plate includes a light incident surface positioned for receiving light beams from the light source, a bottom surface adjacent to the light incident surface, reflective structures provided on the bottom surface, and a light emitting surface configured for emission of the light beams. Each of the reflective structures partially overlaps corresponding adjacent reflective structures at one side, and is partially overlapped by corresponding adjacent reflective structures at an opposite side. A liquid crystal display including the backlight module is also provided.

20 Claims, 3 Drawing Sheets

BACKLIGHT MODULE WITH LIGHT GUIDE PLATE HAVING PARTIALLY OVERLAPPED REFLECTIVE STRUCTURES AND LIQUID CRYSTAL DISPLAY WITH SAME

FIELD OF THE INVENTION

The present invention relates to a backlight module that includes a plurality of partially overlapped reflective structures, and a liquid crystal display (LCD) including the backlight module.

BACKGROUND

Liquid crystal displays are commonly used as display devices for compact electronic apparatuses, not only because they provide good quality images but also because they are very thin. Liquid crystal in a liquid crystal display does not emit any light itself. The liquid crystal requires a light source so as to be able to clearly and sharply display text and images. Therefore, a typical liquid crystal display needs an accompanying backlight module.

Referring to FIG. 7, a typical backlight module 1 includes a light source 10 and a rectangular light guide plate 11. The light guide plate 11 includes a side light incident surface 111, a bottom surface 112 perpendicularly connected with the light incident surface 111, a top light emitting surface 113, and a side surface 114 far from and parallel to the light incident surface 111. That is, the light incident surface 111 and the side surface 114 are between the bottom surface 112 and the light emitting surface 113. The light incident surface 111, the bottom surface 112, the light emitting surface 113, and the side surface 114 are planar and smooth. The light source 10 is located adjacent to the light incident surface 111 of the light guide plate 11.

Light beams from the light source 10 enter the light guide plate 11 through the light incident surface 111. Because the bottom surface 112 is planar and smooth, most of the light beams from the light source 10 reach the bottom surface 112, and are reflected toward the side surface 114 and the light emitting surface 113. The light beams reaching the side surface 114 are further reflected toward the light emitting surface 113. Some of the light beams reaching the light emitting surface 113 are refracted by the light emitting surface 113, because the angles of incidence of these light beams are less than a critical angle of light beams at the light emitting surface 113. The refracted light beams directly emit from the light guide plate 11 through the light emitting surface 113. Other light beams reaching the light emitting surface 113 are totally reflected by the light emitting surface 113, because the angles of incidence of these light beams are greater than the critical angle. The reflected light beams finally emit from the light guide plate 11 through the light emitting surface 113 after being further reflected two or more times within the light guide plate 11. That is, many light beams have long propagation distances within the light guide plate 11 before they finally emit from the light guide plate 11.

The longer the propagation distances of the light beams, the lower the ratio of light utilization of the backlight module 1. In some cases, the backlight module 1 may be considered to have an unsatisfactory ratio of light utilization. Therefore more light sources are needed, or a high-powered light source is needed, to achieve a desired brightness of light beams output from the backlight module 1. However, the additional light sources or the high-powered light source typically result in other problems such as more power consumption, more heat generated, and a higher cost of manufacturing the backlight module 1.

What is needed, therefore, is a backlight module that can circumvent, overcome or at least mitigate the above-described difficulties. What is also needed is a liquid crystal display including the backlight module.

SUMMARY

In an exemplary embodiment, a backlight module includes a light source and a light guide plate. The light guide plate includes a light incident surface positioned for receiving light beams from the light source, a bottom surface adjacent to the light incident surface, a plurality of reflective structures provided on the bottom surface, and a light emitting surface configured for emission of the light beams. Each of the reflective structures partially overlaps corresponding adjacent reflective structures at one side, and is partially overlapped by corresponding adjacent reflective structures at an opposite side. A liquid crystal display including the backlight module is also provided.

Other aspects, novel features and advantages will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of at least one embodiment of the present invention. In the drawings, like reference numerals designate corresponding parts throughout various views, and all the views are schematic.

DETAILED DESCRIPTION OF PREFERRED EMBODIMENTS

Reference will now be made to the drawings to describe preferred and exemplary embodiments of the present invention in detail.

Figure 1:
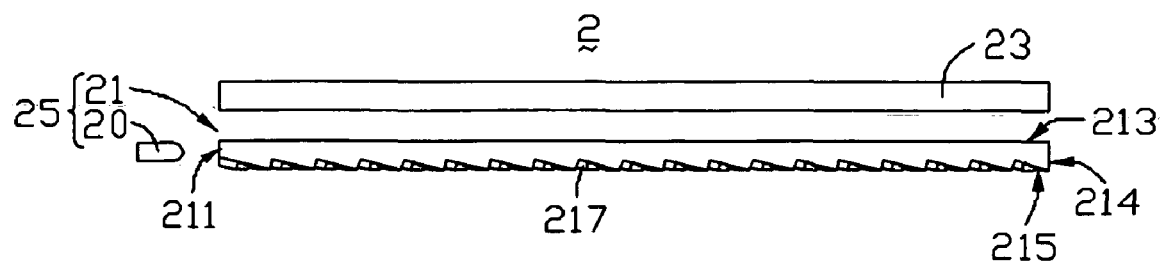
FIG. 1 is an exploded, side-on view of a liquid crystal display according to an exemplary embodiment of the present invention, the liquid crystal display including a liquid crystal panel and a backlight module, the backlight module including a light guide plate.
Figure 2:
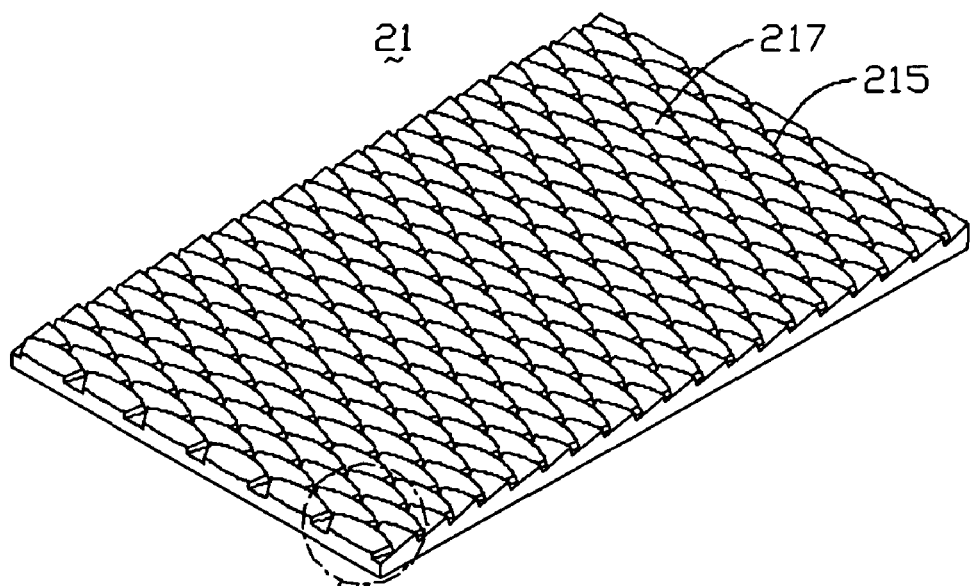
FIG. 2 is an inverted, isometric view of the light guide plate of FIG. 1.
Figure 3:
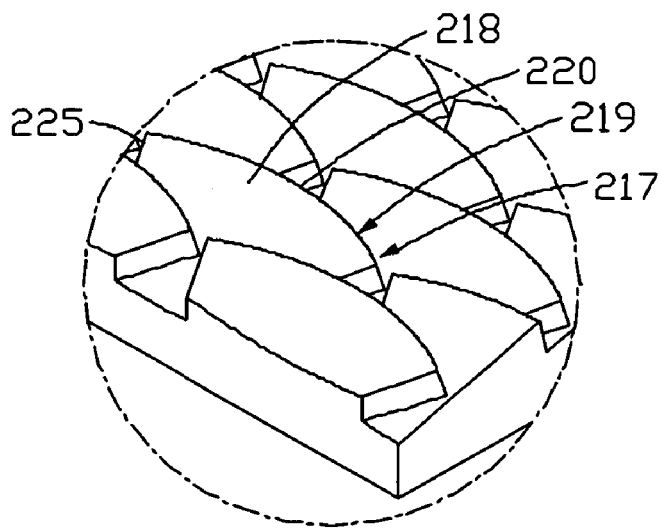
FIG. 3 is an enlarged view of a circled portion III of FIG. 2.
Figure 4:
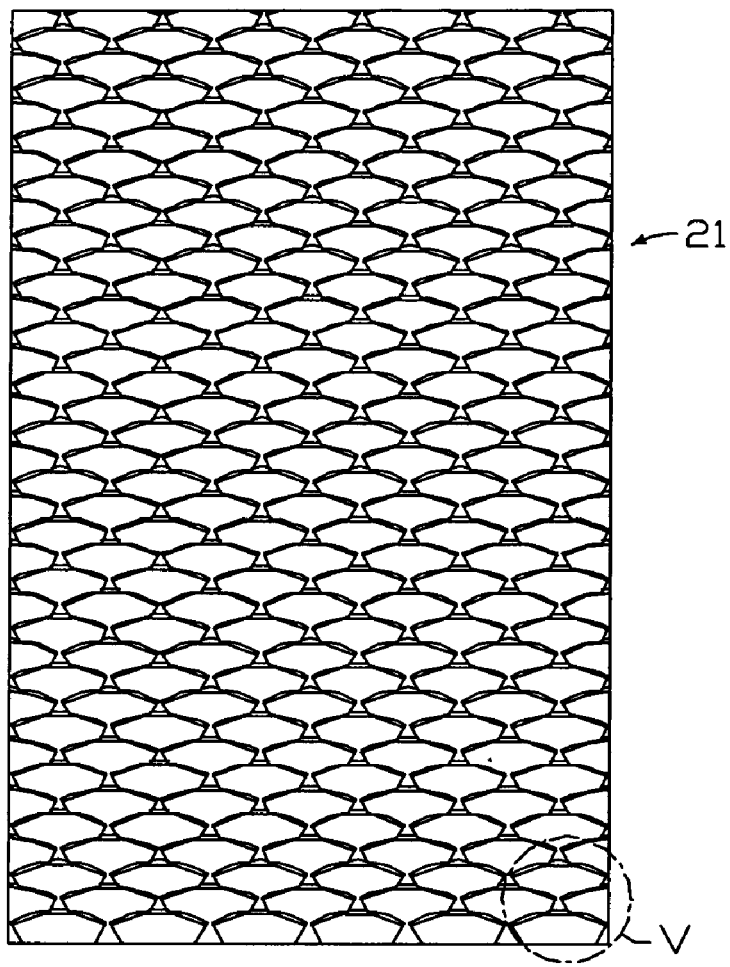
FIG. 4 is a bottom plan view of the light guide plate of FIG. 1.
Figure 5:
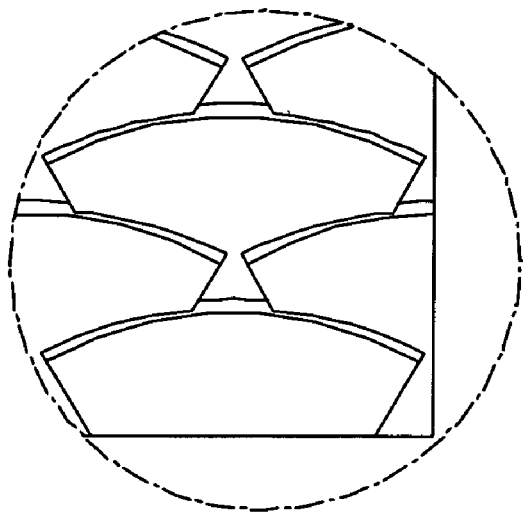
FIG. 5 is an enlarged view of a circled portion V of FIG. 4.

Referring to FIG. 1, a liquid crystal display 2 according to an exemplary embodiment of the present invention is shown. The liquid crystal display 2 includes a liquid crystal panel 23, and a backlight module 25 located adjacent to the liquid crystal panel 23. The backlight module 25 includes a light source 20 and a light guide plate 21.

The light source 20 is located adjacent to a light incident surface 211 of the light guide plate 21, in order to provide light beams for input to the light guide plate 21. The light source 20 is typically a point illuminator, which can for example be a light emitting diode (LED). In an alternative embodiment, the light source 20 can be one or more linear illuminators (not shown), which can for example be one or more cold cathode fluorescent lamps (CCFLs).

The light guide plate 21 is substantially rectangular. The light guide plate 21 includes the light incident surface 211, a top light emitting surface 213 adjacent to the light incident surface 211, a bottom surface 215, a side surface 214 far from and parallel to the light incident surface 211, and a plurality of reflective structures 217 formed at the bottom surface 215. That is, the light incident surface 211 and the side surface 214 are between the light emitting surface 213 and the bottom surface 215.

Referring also to FIG. 2 through FIG. 5, the reflective structures 217 are arrayed in a squamous arrangement of n rows, where n is a natural number greater than 1. The reflective structures 217 of a same row are separate from each other. The reflective structures 217 of the first row are adjacent to the light incident surface 211. All the reflective structures 217 have substantially a same angle of declination relative to the light emitting surface 213. Each reflective structure 217 of a row i (where i is a natural number in the range from 1 to n−1) is generally between two adjacent reflective structures 217 of a row i+1, and partially overlaps the two adjacent reflective structures 217 of the row i+1. Similarly, each reflective structure 217 of the row i is generally between two adjacent reflective structures 217 of a row i−1, and is partially overlapped by the two adjacent reflective structures 217 of the row i−1. That is, each reflective structure 217 is generally between and partially overlaps two adjacent reflective structures 217 of a next row, and is generally between and partially overlapped by two adjacent reflective structures 217 of a previous row.

Each reflective structure 217 has a substantially truncated sector-shaped structure, and includes a bottom curved reflective surface 218 and a curved side reflective surface 219. The bottom reflective surface 218 is slightly concave. The side reflective surface 219 is connected to the bottom reflective surface 218. The side reflective surface 219 has a substantially uniform height along the curvature thereof from one end thereof to the opposite end thereof. However, because of the overlap by the reflective structure 217 on the two reflective structures 217 of the next row, most of the uniform height of the side reflective surface 219 is taken up by the corresponding portions of said two reflective structures 217. Only a middle portion of the side reflective surface 219 (between said two reflective structures 217) has the uniform height thereof exposed. Thus the reflective structures 217 can be considered to have the form of a segment taken from a hollow conical frustum that has a wall of uniform thickness. An angle of an axis of symmetry of the bottom reflective surface 218, relative to the light emitting surface 213, can be configured to be in the range from 12 to 14 degrees. An angle of the side reflective surface 219 relative to the bottom reflective surface 218 is typically in the range from 112 to 115 degrees. Outmost edge portions of the reflective structures 217 along a length of each of two opposite lateral sides of the light guide plate 21 are planarized such that they share a common plane lateral side surface of the light guide plate 21.

The light guide plate 21 and the reflective structures 217 thereof can for example be made as a single body from polycarbonate (PC) or polymethyl methacrylate (PMMA). That is, the light guide plate 21 and the reflective structures 217 thereof are integrated as a one-piece mass of material, which can for example be manufactured by an injection molding method.

Figure 6:
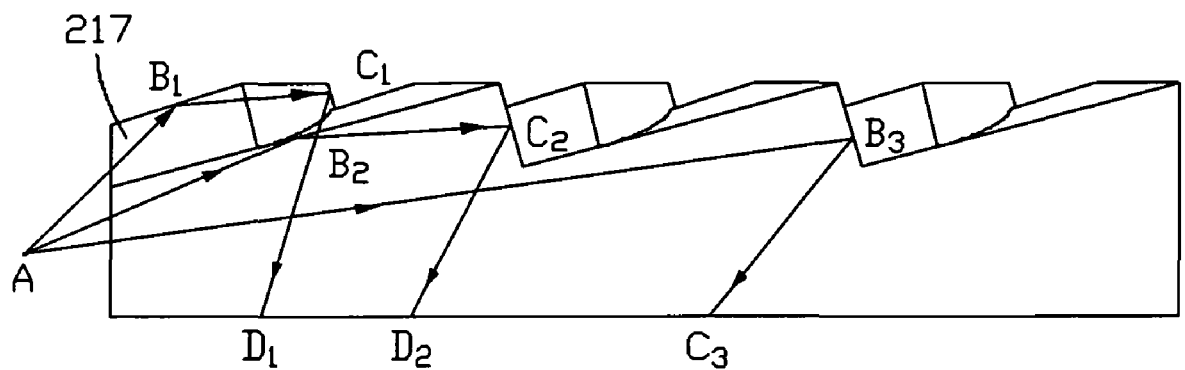
FIG. 6 is an enlarged view of part of the light guide plate of FIG. 1, showing essential optical paths thereof.
Figure 7:
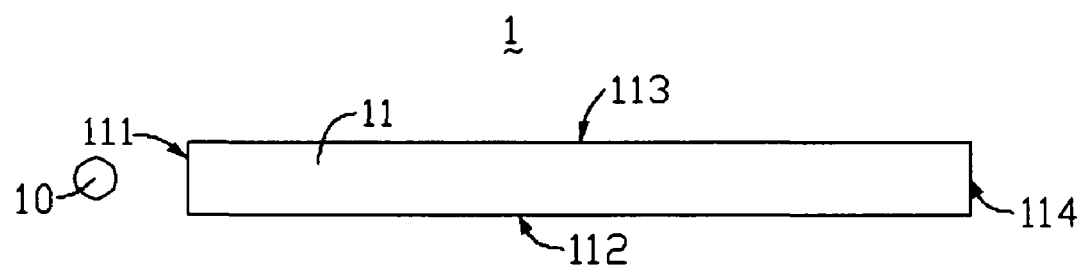
FIG. 7 is a side-on view of a conventional backlight module.

Referring also to FIG. 6, essential optical paths of light beams emitted from the light source 20 are shown. A first representative light beam $AB_1$, a second representative light beam $AB_2$, and a representative third light beam $AB_3$ from the light source 20 respectively enter the light guide plate 21 through the light incident surface 211, and reach the corresponding reflective structures 217 of three different rows, as shown. The first light beam $AB_1$ is reflected to become light beam $B_1C_1$ by the bottom reflective surface 218 of the corresponding reflective structure 217 of one of the rows i, and is further reflected to become light beam $C_1D_1$ by the side reflective surface 219 of the same reflective structure 217. The light beam $C_1D_1$ propagates toward the light emitting surface 213, and finally emits from the light guide plate 21 after being refracted by the light emitting surface 213. The second light beam $AB_2$ is reflected to become light beam $B_2C_2$ by the bottom reflective surface 218 of the corresponding reflective structure 217 of a next row i+1, and is further reflected to become light beam $C_2D_2$ by the side reflective surface 219 of the same reflective structure 217. The light beam $C_2D_2$ propagates toward the light emitting surface 213, and finally emits from the light guide plate 21 after being refracted by the light emitting surface 213. The third light beam $AB_3$ is reflected to become light beam $B_3C_3$ by the side reflective surface 219 of the corresponding reflective structure 217 of a next row i+2. The light beam $B_3C_3$ propagates toward the light emitting surface 213, and finally emits from the light guide plate 21 after being refracted by the light emitting surface 213.

Thus, none of the first, second, and third representative light beams $AB_1$, $AB_2$, and $AB_3$ reaches the side surface 214 far from the light incident surface 211. Instead, all the representative light beams $AB_1$, $AB_2$, and $AB_3$ reach the light emitting surface 213 with angles of incidence less than a critical angle of the light emitting surface 213. That is, none of the first, second, and third representative light beams $AB_1$, $AB_2$, and $AB_3$ is totally reflected by the light emitting surface 213, but instead directly emits from the light guide plate 21 through the light emitting surface 213, after having propagated a relatively short distance within the light guide plate 21.

With the above-described configurations, the reflected structures 217 of the light guide plate 21 can help the light beams from the light source 20 emit from the light guide plate 21 after having propagated relatively short distances within the light guide plate 21. Because of the shorter propagation distances, the ratio of light utilization of the backlight module 25 is high. Accordingly, the optical performance of the liquid crystal display 2 is correspondingly improved. There is typically no need for more light sources 20, or for a more high-powered light source. Accordingly, the cost of manufacturing the backlight module 25 and the liquid crystal display 2 can be contained.

Further or alternative embodiments may include the following. In a first example, the bottom reflective surface 218 can comprise a plurality of generally diamond-shaped reflective structures. In a second example, the side reflective surface 219 can be planar.

It is believed that the present embodiments and their advantages will be understood from the foregoing description, and it will be apparent that various changes may be made thereto without departing from the spirit or scope of the invention or sacrificing all of its material advantages, the examples hereinbefore described merely being preferred or exemplary embodiments of the invention.

What is claimed is:
1. A backlight module comprising:
 a light source; and
 a light guide plate comprising:
  a light incident surface positioned for receiving light beams from the light source;

a bottom surface adjacent to the light incident surface;

a plurality of reflective structures provided at the bottom surface, each of the reflective structures partially overlapping corresponding adjacent reflective structures at one side, and being partially overlapped by corresponding adjacent reflective structures at an opposite side; and a light emitting surface configured for emission of the received light beams.

2. The backlight module as claimed in claim 1, wherein the light guide plate is substantially rectangular.

3. The backlight module as claimed in claim 2, wherein the light emitting surface is essentially perpendicular to the light incident surface.

4. The backlight module as claimed in claim 3, wherein the bottom surface is opposite and parallel to the light emitting surface.

5. The backlight module as claimed in claim 1, wherein the reflective structures are arrayed in a squamous arrangement of rows.

6. The backlight module as claimed in claim 5, wherein the reflective structures of a same row are separate from each other.

7. The backlight module as claimed in claim 5, wherein each reflective structure is between and partially overlaps two adjacent reflective structures of a next row, and is generally between and partially overlapped by two adjacent reflective structures of a previous row.

8. The backlight module as claimed in claim 1, wherein each reflective structure comprises a substantially truncated sector-shaped structure.

9. The backlight module as claimed in claim 8, wherein each reflective structure comprises a bottom curved reflective surface, and an angle of an axis of symmetry of the bottom reflective surface, relative to the light emitting surface, are configured to be in the range from 12 to 14 degrees.

10. The backlight module as claimed in claim 9, wherein each reflective structure further comprises a side reflective surface connected to the bottom reflective surface, and the side reflective surface is slightly concave.

11. The backlight module as claimed in claim 10, wherein the side reflective surface has a substantially uniform height along the curvature thereof from one end thereof to the opposite end thereof.

12. The backlight module as claimed in claim 11, wherein an angle of the side reflective surface relative to the bottom reflective surface is typically in the range from 112 to 115 degrees.

13. The backlight module as claimed in claim 11, wherein outmost edge portions of the reflective structures along a length of each of two opposite lateral sides of the light guide plate are planarized such that they share a common plane lateral side surface of the light guide plate.

14. The backlight module as claimed in claim 1, wherein the light guide plate comprising the reflective structures is a one-piece body.

15. A backlight module comprising:
a light source; and
a light guide plate comprising:
   a light incident surface adjacent to the light source;
   a top light emitting surface approximately perpendicular to the light incident surface;
   a bottom surface; and
   a plurality of reflective structures provided with the bottom surface, the reflective structures being arranged in a regular squamous array.

16. A liquid crystal display comprising:
a liquid crystal panel; and
a backlight module located adjacent to the liquid crystal panel, the backlight module comprising:
   a light source; and
   a light guide plate comprising:
      a light incident surface positioned for receiving light beams from the light source;
      a bottom surface adjacent to the light incident surface;
      a plurality of reflective structures provided at the bottom surface, each of the reflective structures partially overlapping corresponding adjacent reflective structures at one side, and being partially overlapped by corresponding adjacent reflective structures at an opposite side; and
      a light emitting surface configured for emission of the received light beams.

17. The liquid crystal display as claimed in claim 16, wherein the reflective structures are arrayed in a squamous arrangement of rows.

18. The liquid crystal display as claimed in claim 16, wherein each reflective structure comprises a bottom curved reflective surface, and an angle of an axis of symmetry of the bottom reflective surface, relative to the light emitting surface, are configured to be in the range from 12 to 14 degrees.

19. The liquid crystal display as claimed in claim 18, wherein each reflective structure further comprises a side reflective surface connected to the bottom reflective surface, and the side reflective surface is slightly concave.

20. The liquid crystal display as claimed in claim 19, wherein the side reflective surface has a substantially uniform height along the curvature thereof from one end thereof to the opposite end thereof.

* * * * *

UNITED STATES PATENT AND TRADEMARK OFFICE
CERTIFICATE OF CORRECTION

PATENT NO. : 7,898,615 B2  Page 1 of 1
APPLICATION NO. : 12/006007
DATED : March 1, 2011
INVENTOR(S) : Chih-Chung Hsiao et al.

It is certified that error appears in the above-identified patent and that said Letters Patent is hereby corrected as shown below:

On the title page, item (73) should read
-- (73) Assignee: Chimei Innolux Corporation, Miao-Li County (TW) --.

Signed and Sealed this
Fourteenth Day of February, 2012

David J. Kappos
*Director of the United States Patent and Trademark Office*